US011811624B2

(12) United States Patent
Hiraoka et al.

(10) Patent No.: US 11,811,624 B2
(45) Date of Patent: Nov. 7, 2023

(54) EDGE DEVICE LINKING SYSTEM, EDGE DEVICE LINKING METHOD, AND RECORDING MEDIUM

(71) Applicant: Mitsubishi Electric Corporation, Tokyo (JP)

(72) Inventors: Takuya Hiraoka, Tokyo (JP); Hiroaki Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 102 days.

(21) Appl. No.: 17/641,542

(22) PCT Filed: Nov. 15, 2019

(86) PCT No.: PCT/JP2019/044899
§ 371 (c)(1),
(2) Date: Mar. 9, 2022

(87) PCT Pub. No.: WO2021/095241
PCT Pub. Date: May 20, 2021

(65) Prior Publication Data
US 2022/0329497 A1 Oct. 13, 2022

(51) Int. Cl.
*H04L 12/66* (2006.01)
*H04L 41/5009* (2022.01)
*H04L 41/12* (2022.01)

(52) U.S. Cl.
CPC .......... *H04L 41/5009* (2013.01); *H04L 12/66* (2013.01); *H04L 41/12* (2013.01)

(58) Field of Classification Search
CPC ....................................................... H04L 12/66
See application file for complete search history.

(56) References Cited

U.S. PATENT DOCUMENTS

2014/0108943 A1    4/2014   Lee et al.

FOREIGN PATENT DOCUMENTS

| JP | 2014-081937 A | 5/2014 |
| JP | 2018-205897 A | 12/2018 |
| JP | 2019-049905 A | 3/2019 |
| JP | 2019-125068 A | 7/2019 |
| WO | 2016/113870 A1 | 7/2016 |

OTHER PUBLICATIONS

International Search Report of the International Searching Authority dated Jan. 28, 2020 issued in the corresponding International Application No. PCT/JP2019/044899 (and English translation).

*Primary Examiner* — Brian Whipple
(74) *Attorney, Agent, or Firm* — POSZ LAW GROUP, PLC

(57) ABSTRACT

An adapter device includes a device information manager to manage device information with respect to an electrical device, and a service provider to manage service information and provide the service based on service information. The service information indicates content of the service and includes action information indicating an operation of an electrical device and event information indicating a condition for executing the operation indicated by the action information. An adapter device includes a controller to control the operation of the electrical device. Upon determining that the device information with respect to the electrical device satisfies the condition indicated by the event information, the service provider causes the controller to control the electrical device to perform the operation indicated by the action information.

6 Claims, 15 Drawing Sheets

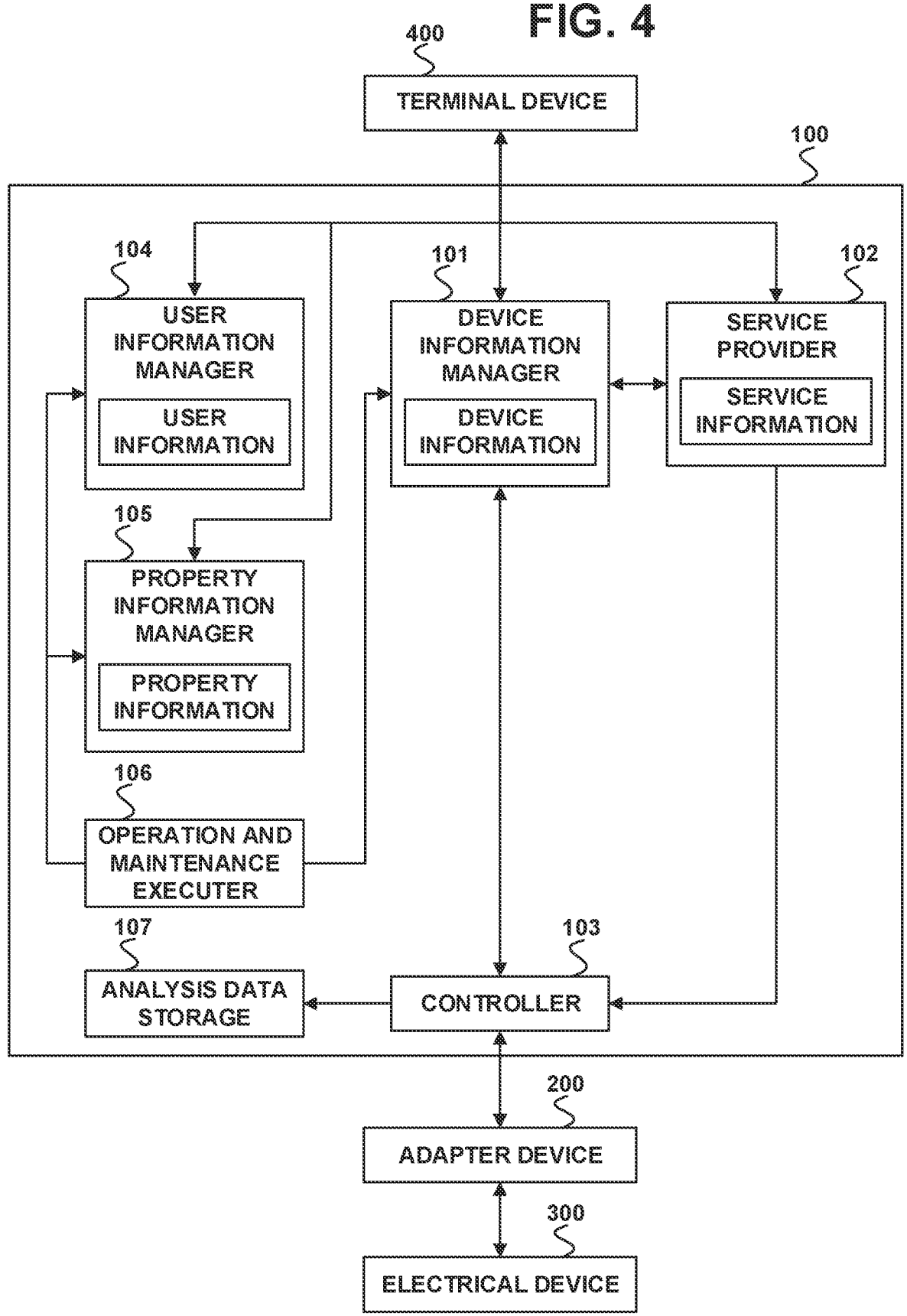

FIG. 5

| ELECTRICAL DEVICE ID | DEVICE INFORMATION ||||||
|---|---|---|---|---|---|---|
| | DEVICE NAME | ADAPTER DEVICE ID | PROPERTY ID | REGISTRATION DATE AND TIME | MEASUREMENT VALUE | SETTING VALUE |
| 1-1 | WATER HEATER | 1-1 | 1 | 2019/12/1 19:00:00 | OPERATION START HOT WATER SUPPLY TEMPERATURE: 30°C | OPERATION MODE: HOT WATER SUPPLY SETTING TEMPERATURE: 40°C |
| 1-2 | BATHROOM DEHUMIDIFIER | 1-2 | 1 | 2019/12/1 19:01:00 | BATHROOM TEMPERATURE: 10°C | OPERATION MODE: HEATING SETTING TEMPERATURE: 20°C |
| 1-3 | AIR CONDITIONER | 1-3 | 1 | 2019/12/1 22:00:00 | INDOOR TEMPERATURE: 20°C SLEEP ONSET DETECTION | OPERATION MODE: HEATING SETTING TEMPERATURE: 20°C |
| 1-4 | IH COOKER | 1-4 | 1 | 2019/12/1 22:00:00 | - | OPERATION MODE: OFF |
| ⋮ | ⋮ | ⋮ | ⋮ | ⋮ | ⋮ | ⋮ |
| 2-1 | AIR CONDITIONER | 2-1 | 2 | 2019/12/1 10:00:00 | INDOOR TEMPERATURE: 20°C | OPERATION MODE: HEATING SETTING TEMPERATURE: 20°C |
| ⋮ | ⋮ | ⋮ | ⋮ | ⋮ | ⋮ | ⋮ |

FIG. 6

| SERVICE ID | SERVICE INFORMATION ||||||
|---|---|---|---|---|---|---|
| | SERVICE NAME | PROPERTY ID | EVENT INFORMATION || ACTION INFORMATION ||
| | | | ELECTRICAL DEVICE ID | CONDITION INFORMATION | ELECTRICAL DEVICE ID | OPERATION INFORMATION |
| 1-1 | LINK BETWEEN WATER HEATER AND BATHROOM DEHUMIDIFIER | 1 | 1-1 | OPERATION MODE: HOT WATER SUPPLY | 1-2 | OPERATION MODE: HEATING SETTING TEMPERATURE: 20°C |
| 1-2 | LINK BETWEEN AIR CONDITIONER AND IH COOKER | 1 | 1-3 | SLEEP ONSET DETECTION | 1-4 | OPERATION MODE: OFF |
| : | : | : | : | : | : | : |
| 2-1 | LINK BETWEEN AIR CONDITIONER AND BATHROOM COOLER/ HEATER | 2 | 2-1 2-2 | DIFFERENCE IN TEMPERATURE BETWEEN LIVING ROOM AND BATHROOM > THRESHOLD | 2-2 | OPERATION MODE: HEATING SETTING TEMPERATURE: 18°C |
| : | : | : | : | : | : | : |

FIG. 7

| USER INFORMATION | | | | |
|---|---|---|---|---|
| USER ID | NAME | EMAIL ADDRESS | GENDER | ADDRESS |
| 1 | Jane Smith | aaa@aaa.com | FEMALE | 1-1-1, xx, A, Tokyo |
| 2 | John Smith | bbb@bbb.com | MALE | 2-2-2, yy, B, Tokyo |
| : | : | : | : | : |

FIG. 8

| PROPERTY INFORMATION | | | |
|---|---|---|---|
| PROPERTY ID | PROPERTY NAME | ADDRESS | USER ID |
| 1 | HOME | 1-1-1, xx, A, Tokyo | 1 |
| 2 | PARENTAL HOME | 2-2-2, yy, B, Tokyo | 2 |
| : | : | : | : |

EDGE DEVICE LINKING SYSTEM, EDGE DEVICE LINKING METHOD, AND RECORDING MEDIUM

CROSS REFERENCE TO RELATED APPLICATION

This application is a U.S. national stage application of International Patent Application No. PCT/JP2019/044899 filed on Nov. 15, 2019, the disclosure of which is incorporated herein by reference.

TECHNICAL FIELD

The present disclosure relates to an edge device linking system, an edge device linking method, and a program.

BACKGROUND

Recent proliferation of Internet-of-Things (IoT) techniques provides connection of various electrical devices to a cloud server. The cloud server has an IoT platform built for providing services relating to the electrical devices, and communication of the electrical devices with a server apparatus included in the cloud server enables a user to use various services provided by the IoT platform.

To use the services provided by the IoT platform, the electrical devices generally connect to an edge device having a communication function. For example, Patent Literature 1 discloses a configuration that connects an electrical device to an adapter device having a communication function in order to communicate with a server apparatus where the IoT platform is built.

PATENT LITERATURE

Patent Literature 1: Unexamined Japanese Patent Application Publication No. 2014-81937

However, when a user uses the services by communication of the electrical device to the server apparatus as described above, various problems may arise, such as loss of communication between the electrical device and the server apparatus, occurrence of delay in providing the services, or the like.

SUMMARY

The present disclosure is made in consideration of the above circumstances, and thus an objective of the present disclosure is to provide an edge device linking system, an edge device linking method, and a program capable of providing a service relating to electrical devices by linking between edge devices without performing communication with a server apparatus.

To achieve the above objective, an edge device linking system according to the present disclosure includes
  a first edge device to be connected to a first electrical device;
  a second edge device to be connected to a second electrical device; and
  a server apparatus to provide a service relating to the first electrical device and the second electrical device,
  wherein
  the first edge device, the second edge device, and the server apparatus are communicatively connected to one another,
  the first edge device includes
    device information management means for managing device information with respect to the first electrical device, and
    first service provision means for managing service information and providing the service based on the service information, the service information indicating content of the service and including action information indicating an operation of the second electrical device and event information indicating a condition for executing the operation indicated by the action information,
  the second edge device includes control means for controlling the operation of the second electrical device, and
  when the first service provision means of the first edge device determines that the device information with respect to the first electrical device satisfies the condition indicated by the event information, the first service provision means of the first edge device causes the control means of the second edge device to control the second electrical device to perform the operation indicated by the action information.

The present disclosure provides an edge device linking system, an edge device linking method, and a program capable of providing a service relating to electrical devices by linking of edge devices without performing communication with a server apparatus.

BRIEF DESCRIPTION OF DRAWINGS

FIG. 4 is a block diagram illustrating a functional configuration of the server apparatus according to Embodiment 1;

FIG. 5 is a diagram illustrating device information data according to Embodiment 1;

FIG. 6 is a diagram illustrating service information data according to Embodiment 1;

FIG. 7 is a diagram illustrating user information data according to Embodiment 1;

FIG. 8 is a diagram illustrating property information data according to Embodiment 1;

DESCRIPTION OF EMBODIMENTS

Embodiment 1

An edge device linking system according to Embodiment 1 is a system capable of providing services relating to electrical devices by linking of edge devices without performing communication with a server apparatus. The edge device is a device that has communication functions of transmitting information of the electrical devices to the server apparatus and receiving information from the server apparatus. In the present embodiment, the edge device is assumed to be an adapter device dedicated for an electrical device, for communicating with the server apparatus.

Figure 1:
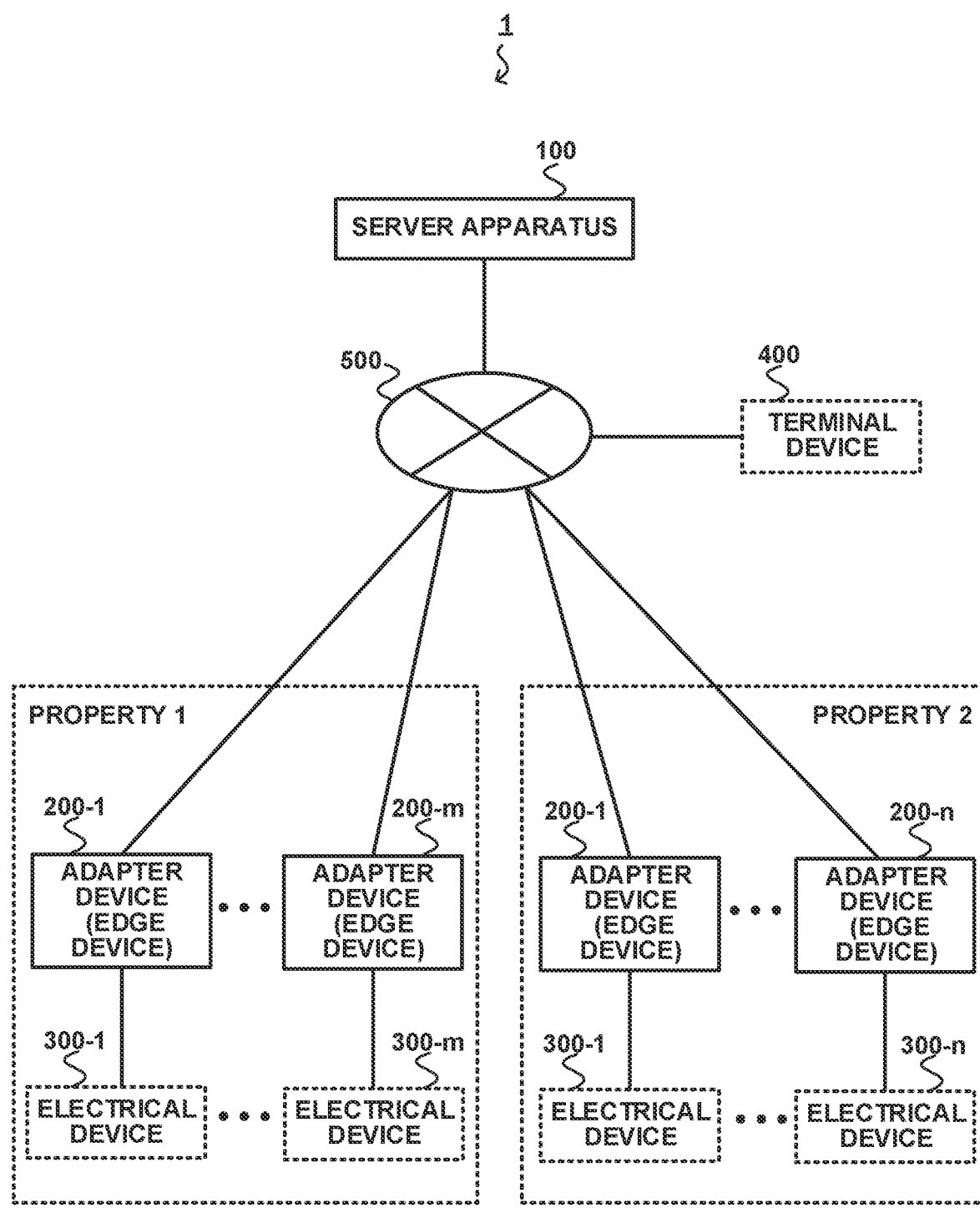
FIG. 1 is a block diagram illustrating an overall configuration of an edge device linking system according to Embodiment 1.

As illustrated in FIG. 1, the edge device linking system 1 includes a server apparatus 100 that provides a service, and adapter devices 200-1, . . . , 200-m, 200-n connected to electrical devices 300-1, . . . , 300-m, 300-n installed in a property, where m and n are natural numbers not less than 2. The property is, for example, a residence or an office building. The adapter devices 200-1, . . . , 200-m and the electrical devices 300-1, . . . , 300-m are installed in a property, and the adapter devices 200-1, . . . , 200-n and the electrical devices 300-1, . . . , 300-n are installed in a property 2. The adapter devices 200-1, . . . , 200-m, 200-n are collectively hereinafter referred to as an adapter device 200 except where a specific adapter device is described. Similarly, the electrical devices 300-1, . . . , 300-m, 300-n are collectively hereinafter referred to as an electrical device 300 except where a specific electrical device is described.

The server apparatus 100 is typically a cloud server and provides an IoT platform. The IoT platform collects information from the electrical device 300 and provides services relating to the electrical device 300. Here, the services include a service of enabling an operation of the electrical device 300 through a terminal device 400, a service of automatic control of the electrical device 300, and a service of automatic control of a plurality of electrical devices 300 by linking of a plurality of edge devices.

The adapter device 200 is a device for connecting the electrical device 300 installed in the property to the server apparatus 100 where the IoT platform is built. The adapter device 200 is externally attached to the electrical device 300, and transmits and receives information by wired or wireless communication between the adapter device 200 and the electrical device 300. The adapter device 200 includes a part of functions that the server apparatus 100 has, as described later. This can provide, without intervention of the server apparatus 100, a service of operation of the electrical device 300 through the terminal device 400, a service of automatic control of the electrical device 300, and the like.

The electrical device 300 is a device installed in a residence, such as an air conditioner, a water heater, a bathroom dehumidifier, a dressing room cooler/heater, an induction heating (IH) cooker, a bathroom cooler/heater, a lighting device, a refrigerator, a television, a floor cooling/heating system, and the like. The electrical device 300 includes a device installed on the premises of the residence.

The terminal device 400 is a device used by a user who receives services provided by the server apparatus 100. The terminal device 400 is a personal computer, a smartphone, a tablet terminal, and the like. The terminal device 400 has an application installed therein to use functions and services provided by the server apparatus 100.

The network 500 is a wireless or wired communication network, such as the Internet, an intranet, an extranet, a local area network (LAN), a virtual private network (VPN), a telephone network, and the like.

Figure 2:
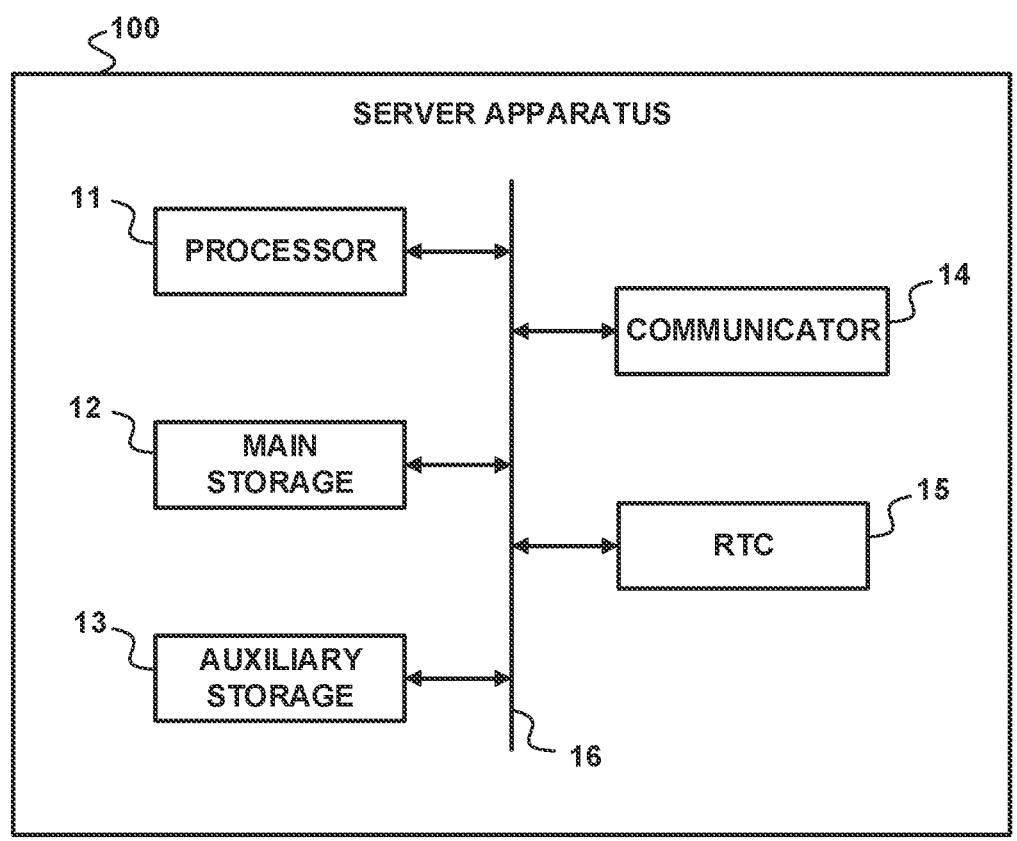
FIG. 2 is a block diagram illustrating a hardware configuration of a server apparatus according to Embodiment 1.

A hardware configuration of the server apparatus 100 is described with reference to FIG. 2. The server apparatus 100 includes a processor 11 that executes processing to realize the services provided by the IoT platform, a main storage 12 that is used as a work area for the processor 11, and an auxiliary storage 13 that stores various types of data to be used for processing by the processor 11, a communicator 14 for communication with an external device, and a real time clock (RTC) 15 that keeps time. The main storage 12, the auxiliary storage 13, the communicator 14, and the RTC 15 are all connected to the processor 11 via a bus 16.

The processor 11 includes a central processing unit (CPU). The processor 11 achieves various functions of the server apparatus 100 by executing a program stored in the auxiliary storage 13.

The main storage 12 includes a random access memory (RAM). The program is loaded from the auxiliary storage 13 into the main storage 12. The main storage 12 is then used as a work area for the processor 11.

The auxiliary storage 13 includes a non-volatile memory such as an electrically erasable programmable read-only memory (EEPROM). In addition to the program, the auxiliary storage 13 stores various types of data for use in processing by the processor 11. The auxiliary storage 13 supplies data to be used by the processor 11 to the processor 11 in accordance with the instructions of the processor 11 and stores the data supplied by the processor 11.

The communicator 14 includes a network interface circuit for communicating with the external device. The communicator 14 receives a signal from the external device and outputs data indicated by the signal to the processor 11. The communicator 14 also transmits a signal indicating the data output by the processor 11 to the external device.

The RTC 15 is a timekeeping device including an oscillator circuit using a quartz oscillator. For example, the RTC 15 has a built-in battery to continue the keeping of time even when the server apparatus 100 is powered off.

Figure 3:
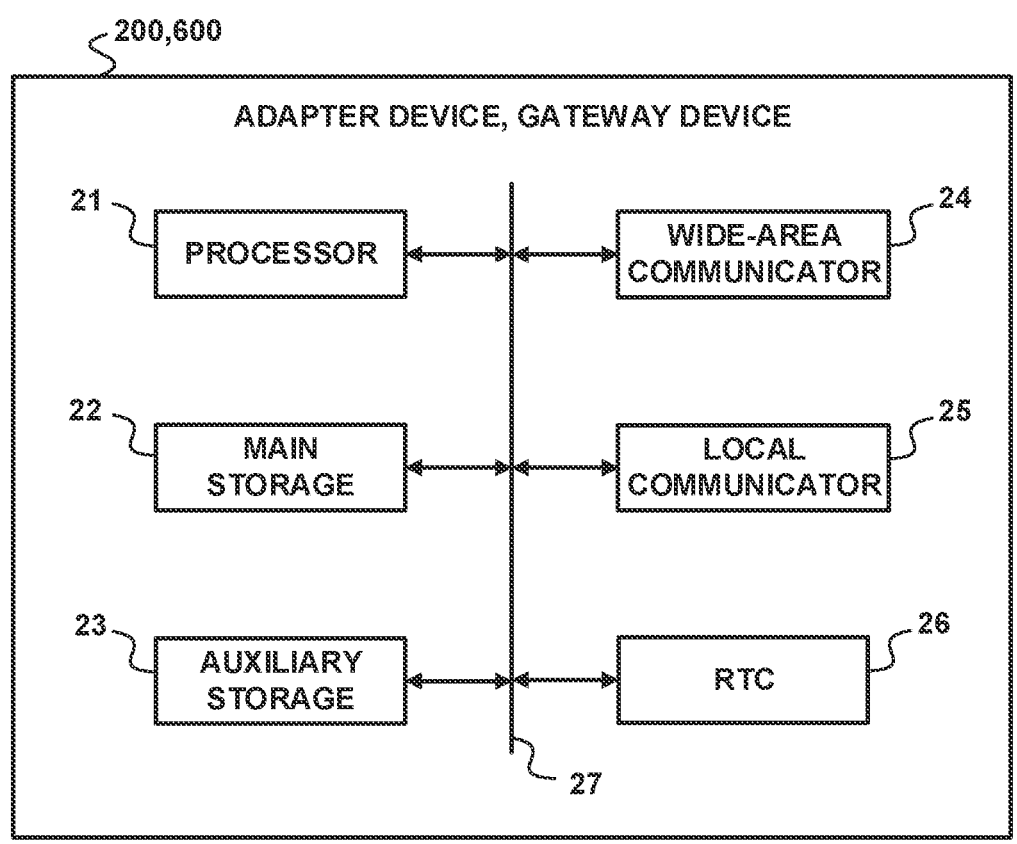
FIG. 3 is a block diagram illustrating a hardware configuration of an adapter device and a gateway device according to Embodiment 1.

Next, a hardware configuration of the adapter device 200 is described with reference to FIG. 3. The hardware configuration of the adapter device 200 is the same as the hardware configuration of the gateway device 600 of Embodiment 2, which is described later, and thus FIG. 3 also illustrates a hardware configuration of the gateway device 600.

The adapter device 200 includes a processor 21 that performs processing to provide services relating to the electrical device 300, a main storage 22 for use as a work area for the processor 21, an auxiliary storage 23 that stores various types of data for use in processing by the processor 21, a wide-area communicator 24 for communicating with an external device, a local communicator 25 for communication with the electrical device 300 installed in the residence, and an RTC 26 that keeps time. The main storage 22, the auxiliary storage 23, the wide-area communicator 24, the local communicator 25, and the RTC 26 are all connected to the processor 21 via a bus 27.

The processor 21, the main storage 22, the auxiliary storage 23, and the RTC 26 have the same functions as those of the processor 11, the main storage 12, the auxiliary storage 13, and the RTC 15, respectively.

The wide-area communicator 24 includes a network interface circuit for communicating with the external devices, such as the server apparatus 100, the terminal device 400, or the like. The wide-area communicator 24 receives a signal from the external device and outputs the data indicated by the signal to the processor 21. The wide-area communicator 24 also transmits a signal indicating the data output by the processor 21 to the external device.

The local communicator 25 includes a network interface circuit for communicating with the electrical device 300. The local communicator 25 receives a signal from the electrical device 300 and outputs the data indicated by the signal to the processor 21. The local communicator 25 also transmits a signal indicating the data output from the processor 21 to the electrical device 300.

Next, functions of the server apparatus 100 are described with reference to FIG. 4. The server apparatus 100 functionally includes a device information manager 101 that manages device information relating to the electrical device 300, a service provider 102 that manages service information, a controller 103 that controls the electrical device 300 via the adapter device 200, a user information manager 104 that manages user information relating to the user, a property information manager 105 that manages property information of the property where the electrical device 300 is installed, an operation and maintenance executor 106 that operates and maintains the edge device linking system 1 based on an instruction by an administrator, and an analysis data storage 107 that stores data for analysis in the edge device linking system 1.

The device information manager 101 manages device information with respect to the electrical device 300. Specifically, the device information manager 101 receives an operation instruction for the electrical device 300 from the terminal device 400, sends the received instruction to the controller 103, and registers the device information based on the information received from the controller 103. The device information manager 101 is achieved by cooperation of the processor 11, the main storage 12, the auxiliary storage 13, and the communicator 14.

The device information is information that includes information to identify the device, setting values, such as the operation mode, set temperature, and the like of the electrical device 300, and measurement values measured by the electrical device 300. An example of the device information is illustrated in FIG. 5.

The table in FIG. 5 includes information with respect to the electrical devices 300 installed in properties. The table in FIG. 5 includes, in association with one another, an electrical device ID to identify the electrical device 300, a device name of the electrical device 300, an adapter device ID to identify the adapter device 200 that is connected to the electrical device 300, a property ID to identify a property where the electrical device 300 is installed, a registration date and time when a measurement value and a setting value are registered, the measurement value obtained by measurement by the electrical device 300, and the setting value set to which the electrical device 300 is set. The measurement value, the setting value, and the registration date and time are updated each time the information with respect to the measurement value and the setting value are received from the controller 103.

The record in the first row of the table in FIG. 5 indicates that the electrical device with the electrical device ID "1-1" has the device name "water heater" and is connected to the adapter device with the adapter device ID "1-1", and is installed in a property indicated by the property ID "1"; and the measurement value and the setting value are registered at "19:00:00 on Dec. 1, 2019", the measurement value, that is, the current hot water supply temperature, is "30° C.", and the setting value, that is, the set hot water supply temperature, is "40° C.".

The service provider 102 of FIG. 4 manages execution of the services provided by the server apparatus 100. Specifically, the service provider 102 receives a request for registration of a service from the terminal device 400 and registers content of the service as service information. The service provider 102 determines, based on the service information, whether or not to operate the electrical device 300. The service provider 102 is achieved by cooperation of the processor 11, the main storage 12, the auxiliary storage 13, and the communicator 14. The service provider 102 is an example of second service provision means.

The service information is information including information with respect to the property for which the service is to be performed and the content of the service. The content of the service includes action information indicating the operation of the electrical device 300 and event information indicating a condition under which the operation is to be performed. The service provider 102 determines whether the value indicated by the device information satisfies the condition indicated by the event information, and when determination is made that the value indicated by the device information satisfies the condition, provides an instruction to make the electrical device 300 perform the operation indicated by the action information. An example of the service information is illustrated in FIG. 6.

In the table in FIG. 6, a service ID to identify the service, a service name, a property ID to identify the property for which the service is provided, event information, and action information are registered in association with one another. The event information includes the electrical device ID and condition information, and the action information includes the electrical device ID and operation information. When a state of the electrical device indicated by the electrical device ID in the event information satisfies the content of the condition information, the service provider 102 sends to the controller 103 an instruction to cause the electrical device indicated by the electrical device ID in the action information to perform the operation indicated by the operation information.

The record in the first row of the table in FIG. 6 shows that the service ID "1-1" indicates a service to "link a water heater and a bathroom dehumidifier", and this service is a service performed in the property with the property ID "1", and when the operation mode of the electrical device indicated by the electrical device ID "1-1", that is, the water heater, turns into "hot water supply", the electrical device indicated by ID "1-2", that is, the bathroom humidifier, is caused to operate in the operation mode "heating", and the setting temperature is set to "20° C.".

The service that is "link between water heater and bathroom dryer" with the service ID "1-1" in FIG. 6 is a service that causes the bathroom dehumidifier to operate in a heating operation when water heating of the water heater starts, which helps prevent thermal shock. The service that is "link between air conditioner and bathroom cooler/heater" with the service ID "2-1" is a service that causes the bathroom cooler/heater to operate in a heating operation when a difference between the living room temperature measured by the air conditioner and the bathroom temperature measured by the bathroom heater/cooler exceeds a threshold, which also helps prevent thermal shock. The service that is "link between air conditioner and IH cooker" with the service ID "1-2" is a service of turning off the power of the IH cooker upon the air conditioner detecting the onset of sleep of the user using information obtained from an infrared sensor, which helps prevent the user from forgetting to turn off the IH cooker.

The service provider 102 also determines whether the service indicated in the service information can be provided by the edge device such as the adapter device 200. Whether or not the service can be provided by the edge device is determined based on the relationship between the edge devices. For example, as for a service that links multiple electrical devices, determination is made that provision of the service by the adapter device 200 is achievable in a case where the adapter device of one electrical device can control the adapter device of another electrical device, multiple electrical devices are connected to the same adapter device, multiple electrical devices are connected to the same gateway device, or the like. Upon determining that the service can be provided by the adapter device 200, the service provider 102 causes a later-described service provider 202 of the adapter device 200 to register the service information.

The controller 103 of FIG. 4 controls the operation of the electrical device 300 via the adapter device 200. Specifically, the controller 103 receives the instruction to operate the electrical device 300 from various components of the server apparatus 100 and transmits the instruction to the adapter device 200. The controller 103 periodically collects data, such as measurement values and setting values, from the electrical device 300 via the adapter device 200. The controller 103 is achieved by cooperation of the processor 11 and the communicator 14.

The term "periodically collects" refers to the fact that the controller 103 repeatedly collects data from the electrical device 300, and the intervals at which the data is collected are not limited to fixed intervals. The interval can be arbitrarily set by an administrator of the edge device linking system 1. The interval may be set in accordance with a predetermined rule or may be set to an irregular value.

The user information manager 104 of FIG. 4 manages user information about a user who uses the electrical device 300. Specifically, the user information manager 104 receives registration of the user information from the terminal device 400 and registers the received information. The user information manager 104 is achieved by cooperation of the processor 11, the main storage 12, the auxiliary storage 13, and the communicator 14. An example of the user information is illustrated in FIG. 7.

In the table in FIG. 7, a user ID to identify a user, a user name, an e-mail address, gender, and an address are registered in association with one another.

The record in the first row of the table in FIG. 7 indicates that the name of the user with the user ID "1" is "Jane Smith", the email address is "aaa@aaa.com", the gender is "female", and the address is "1-1-1, xx, A, Tokyo".

The property information manager 105 of FIG. 4 manages property information about the property where the electrical device 300 is installed. Specifically, the property information manager 105 receives registration of the property information from the terminal device 400 and registers the received information. The property information manager 105 is achieved by cooperation of the processor 11, the main storage 12, the auxiliary storage 13, and the communicator 14. An example of the property information is illustrated in FIG. 8.

In the table of FIG. 8, a property ID to identify a property, a property name, an address, and a user ID to identify a user who is a user of the electrical device 300 installed in the property are registered in association with one another.

The record in the first row of the table in FIG. 8 indicates that the property name of the property ID "1" is "home," the address is "1-1-1, xx, A, Tokyo", and the user of the electrical device 300 installed in the property is the user with the user ID "1".

The operation and maintenance executor 106 of FIG. 4 operates and maintains the edge device linking system 1 based on an instruction of the administrator of the edge device linking system 1. The operation and maintenance executor 106 accesses the device information manager 101, the user information manager 104, and the property information manager 105, and acquires and rewrites information. The operation and maintenance executor 106 is achieved by cooperation of the processor 11 and the communicator 14.

The analysis data storage 107 of FIG. 4 collects and stores data about the electrical device 300 via the controller 103. The analysis data storage 107 provides the stored data based on the instructions of the administrator of the edge device linking system 1, a person who has received a license to use the data, or the like. The analysis data storage 107 is achieved by cooperation of the processor 11, the main storage 12, the auxiliary storage 13, and the communicator 14.

Next, functions of the adapter device 200 are described with reference to FIG. 9. The adapter device 200 includes some of the functions of the server apparatus 100. Specifically, the adapter device 200 includes a device information manager 201, a service provider 202, and a controller 203.

The device information manager 201 manages device information with respect to the electrical devices 300 connected to the adapter device 200. Specifically, the device information manager 201 receives an instruction for operation of the electrical device 300 from the terminal device 400, sends the received instruction to the controller 203, and registers the device information based on the information received from the controller 203. The device information manager 201 is achieved by cooperation of the processor 21, the main storage 22, the auxiliary storage 23, and the wide-area communicator 24. The device information manager 201 is an example of device information management means.

The device information managed by the device information manager 201 has the same items as the items included in the table in FIG. 5, but only includes information with respect to the electrical device 300 connected to the adapter device 200. Here, the connected electrical device 300 includes both a physically connected electrical device and a logically connected electrical device. For example, in a case where the adapter device 200 is an adapter device externally attached to the water heater with the electrical device ID "1-1," the device information managed by the device information manager 201 of the adapter device 200 includes only the device information associated with the electrical device ID "1-1" in the table in FIG. 5.

Figure 9:
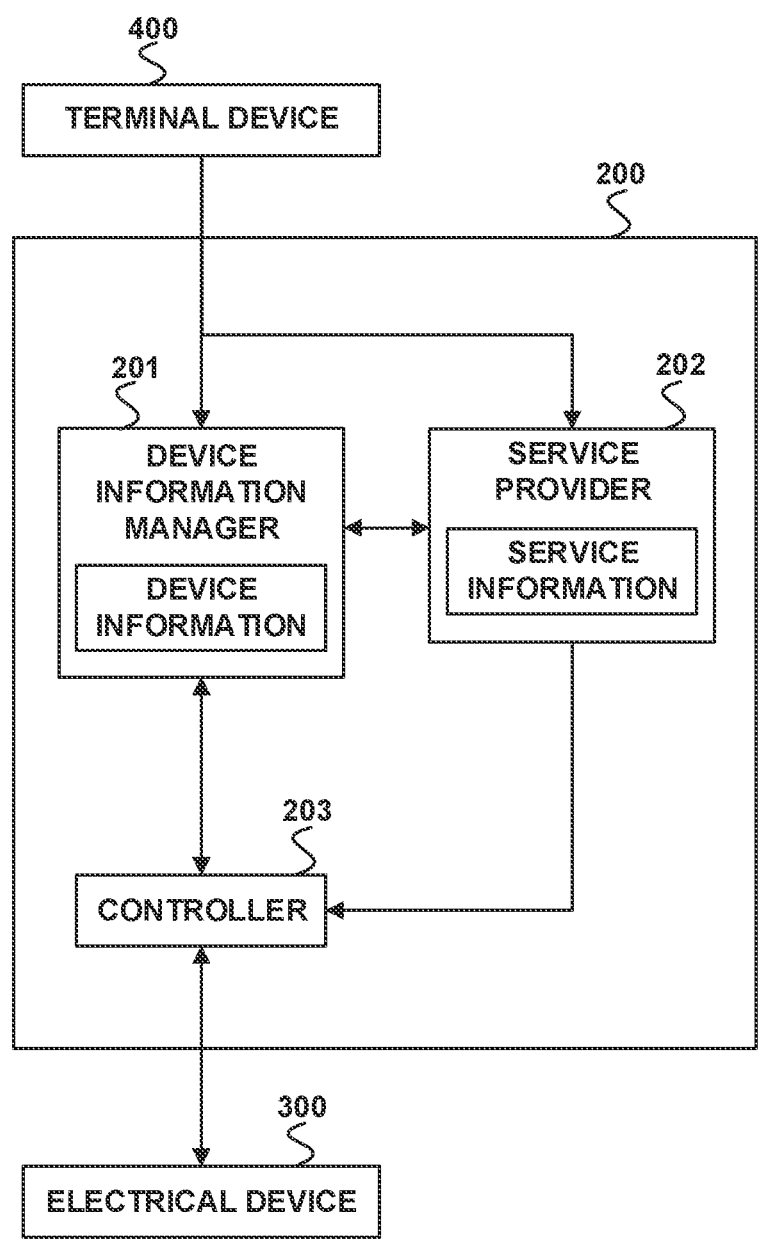
FIG. 9 is a block diagram illustrating a functional configuration of the adapter device according to Embodiment 1.

The service provider 202 of FIG. 9 manages execution of services. Specifically, the service provider 202 receives from the server apparatus 100 an instruction to register a service, and registers content of the service as service information. The service provider 202 determines, based on the service information, whether or not to allow operation of the electrical device 300. The service provider 202 is achieved by cooperation of the processor 21, the main storage 22, the auxiliary storage 23, and the wide-area communicator 24.

The service provider 202 is an example of first service provision means and service provision means.

The service information managed by the service provider 202 has the same items as the items included in the table in FIG. 6, but only includes information with respect to the service directed to the electrical device 300 connected to the adapter device 200. For example, in a case where the adapter device 200 is an adapter device externally attached to the water heater with the electrical device ID "1-1," the service information managed by the service provider 202 includes only the service information associated with the electrical device ID "1-1" included in the event information in the table in FIG. 6.

The controller 203 of FIG. 9 controls operation of the electrical device 300 connected to the adapter device 200. Specifically, the controller 203 receives an instruction for operation of the electrical device 300 from the device information manager 201 and the service provider 202, and transmits the instruction to the electrical device 300. The controller 203 receives an instruction for operation of the electrical device 300 from the controller 103 of the server apparatus 100 and transmits the instruction to the electrical device 300. The controller 203 periodically collects data, such as measurement values and setting values, from the electrical device 300. The controller 203 is achieved by cooperation of the processor 21, the wide-area communicator 24, and the local communicator 25. The controller 203 is an example of control means.

An application programming interface (API) for transmitting and receiving information between the server apparatus 100 of FIG. 4 and an external device such as the terminal device 400 is the same as that of the API for transmitting and receiving information between the adapter device 200 of FIG. 9 and the external device.

Next, operation of the edge device linking system 1 of the present embodiment is described. FIGS. 10 to 13 are sequence diagrams illustrating flows of processing performed among the server apparatus 100, the adapter device 200, the electrical device 300, and the terminal device 400 when services are provided in the edge device linking system 1.

Figure 10:
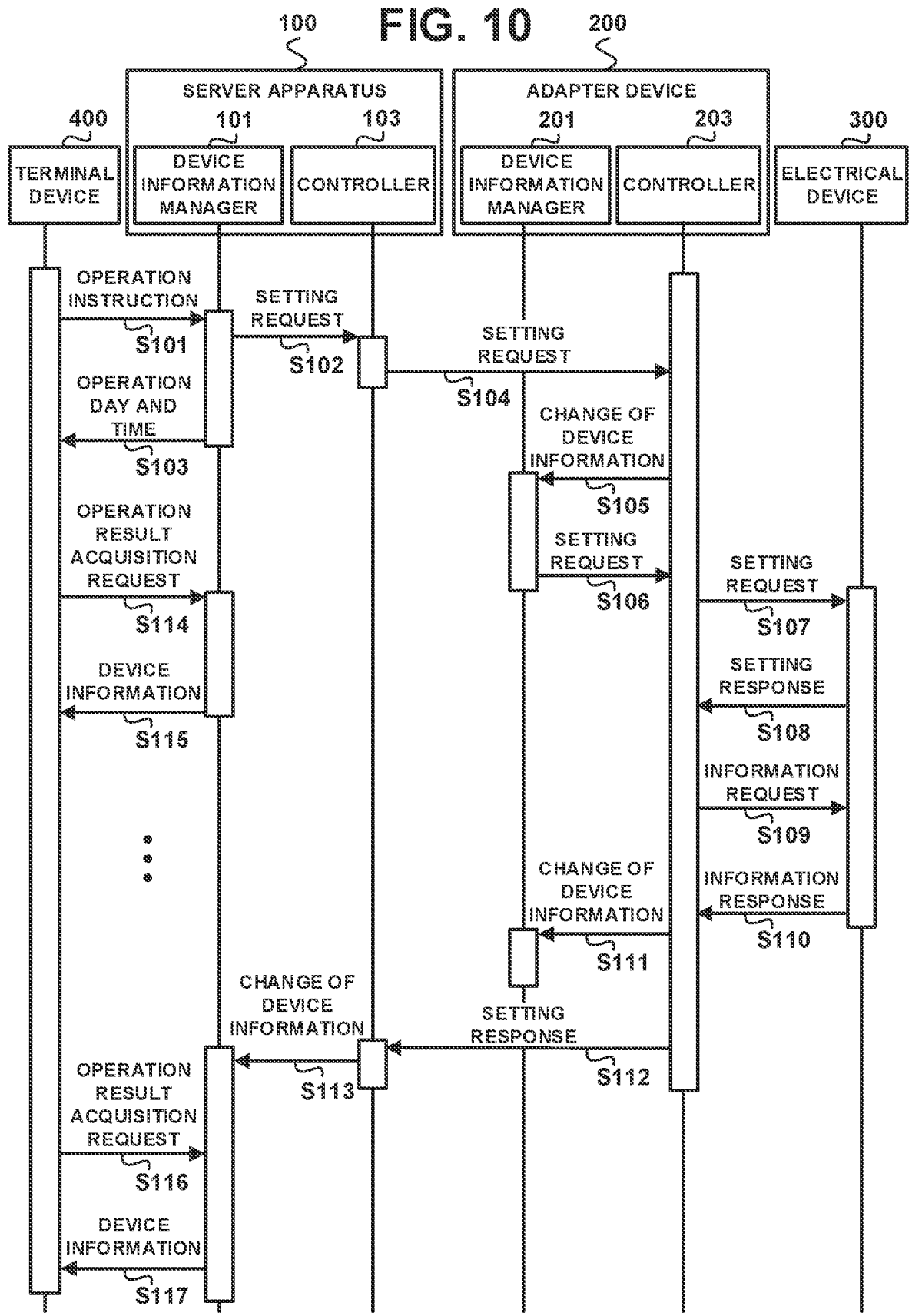
FIG. 10 is a sequence diagram illustrating a process flow of device operation (outdoor mode) executed between the server apparatus and the adapter device according to Embodiment 1.
Figure 11:
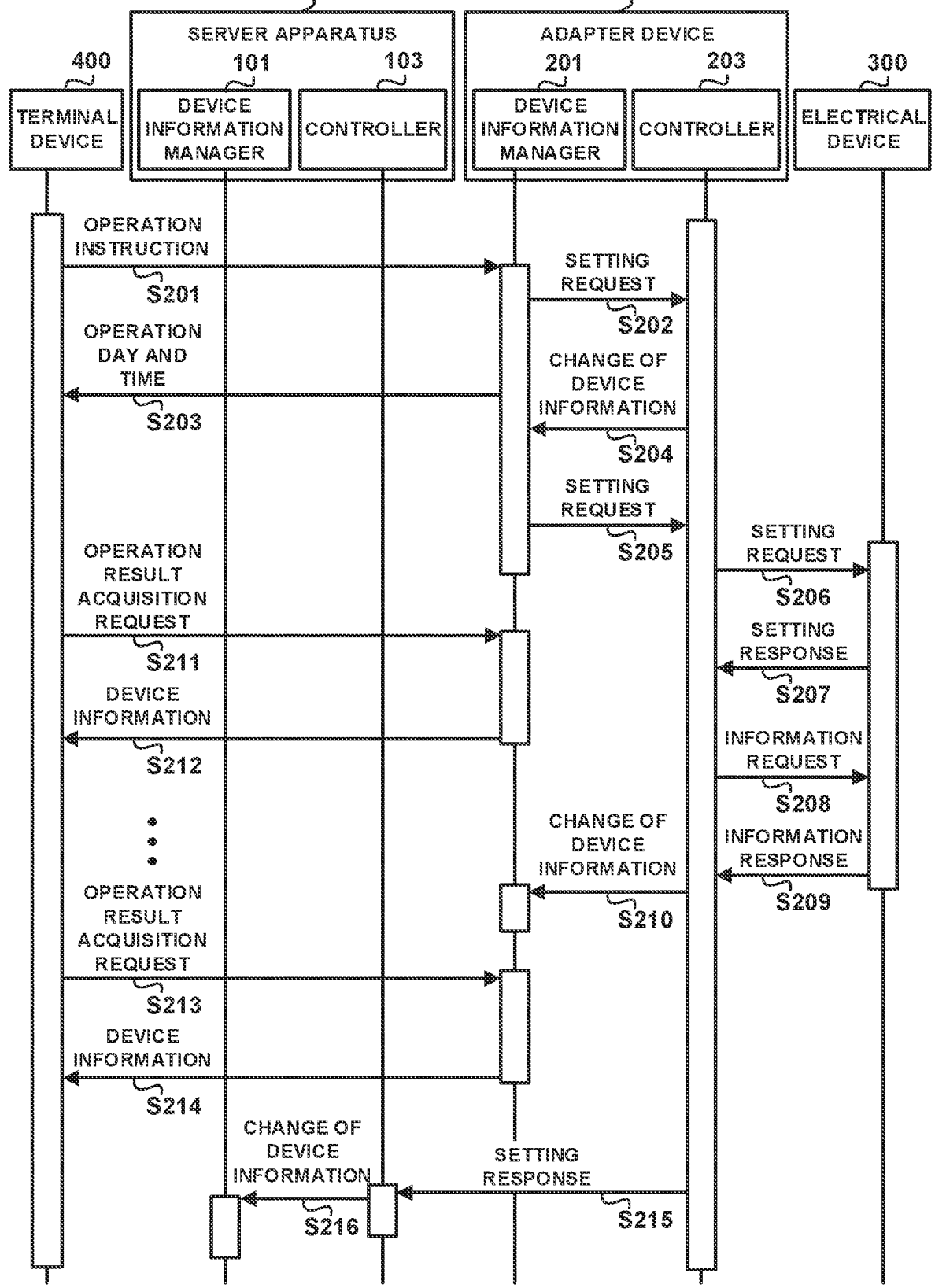
FIG. 11 is a sequence diagram illustrating a process flow of device operation (indoor mode) executed between the server apparatus and the adapter device according to Embodiment 1.
Figure 12:
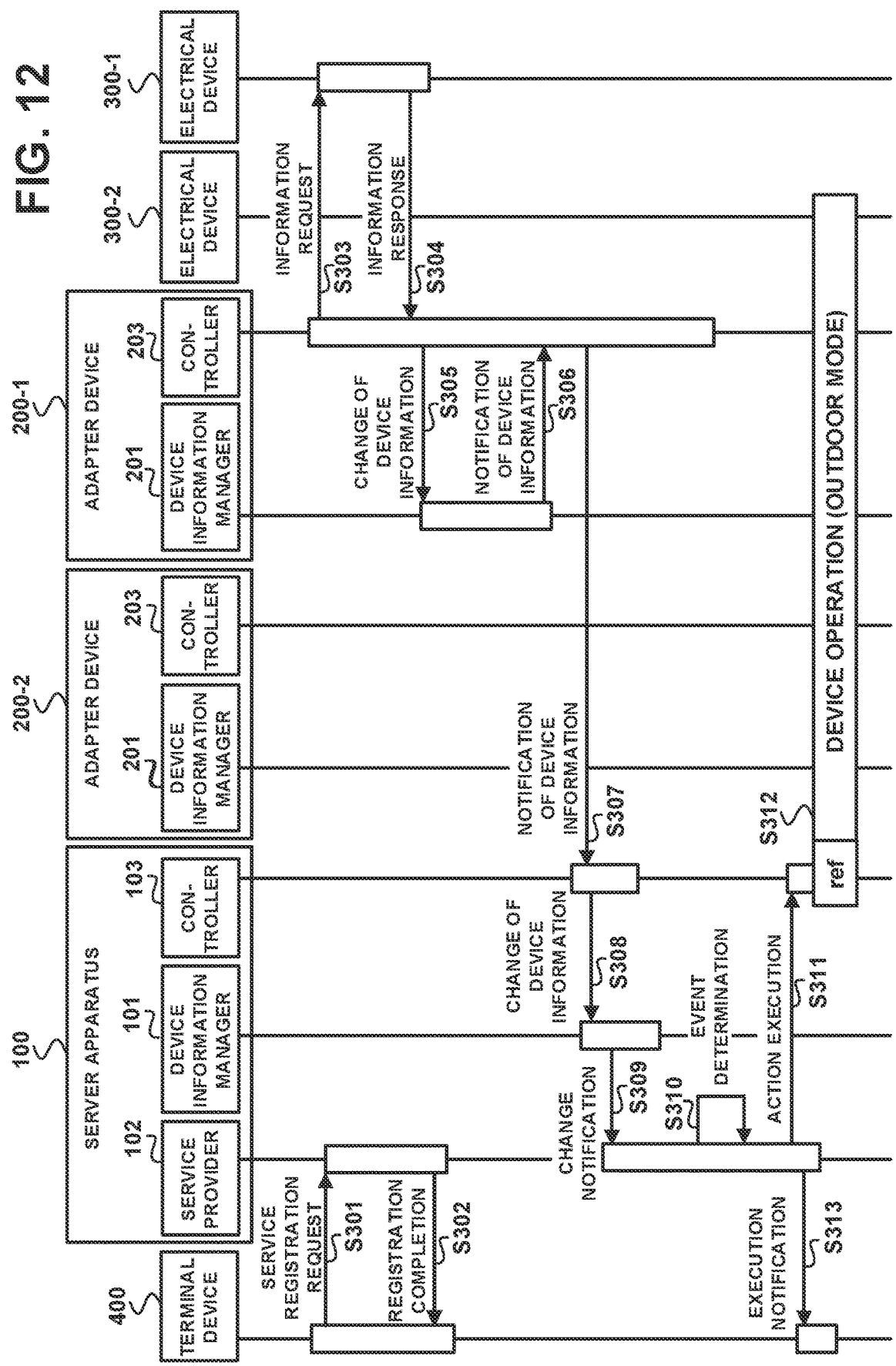
FIG. 12 is a sequence diagram illustrating a process flow of automatic control (server-device-route mode) executed between the server apparatus and the adapter devices according to Embodiment 1.
Figure 13:
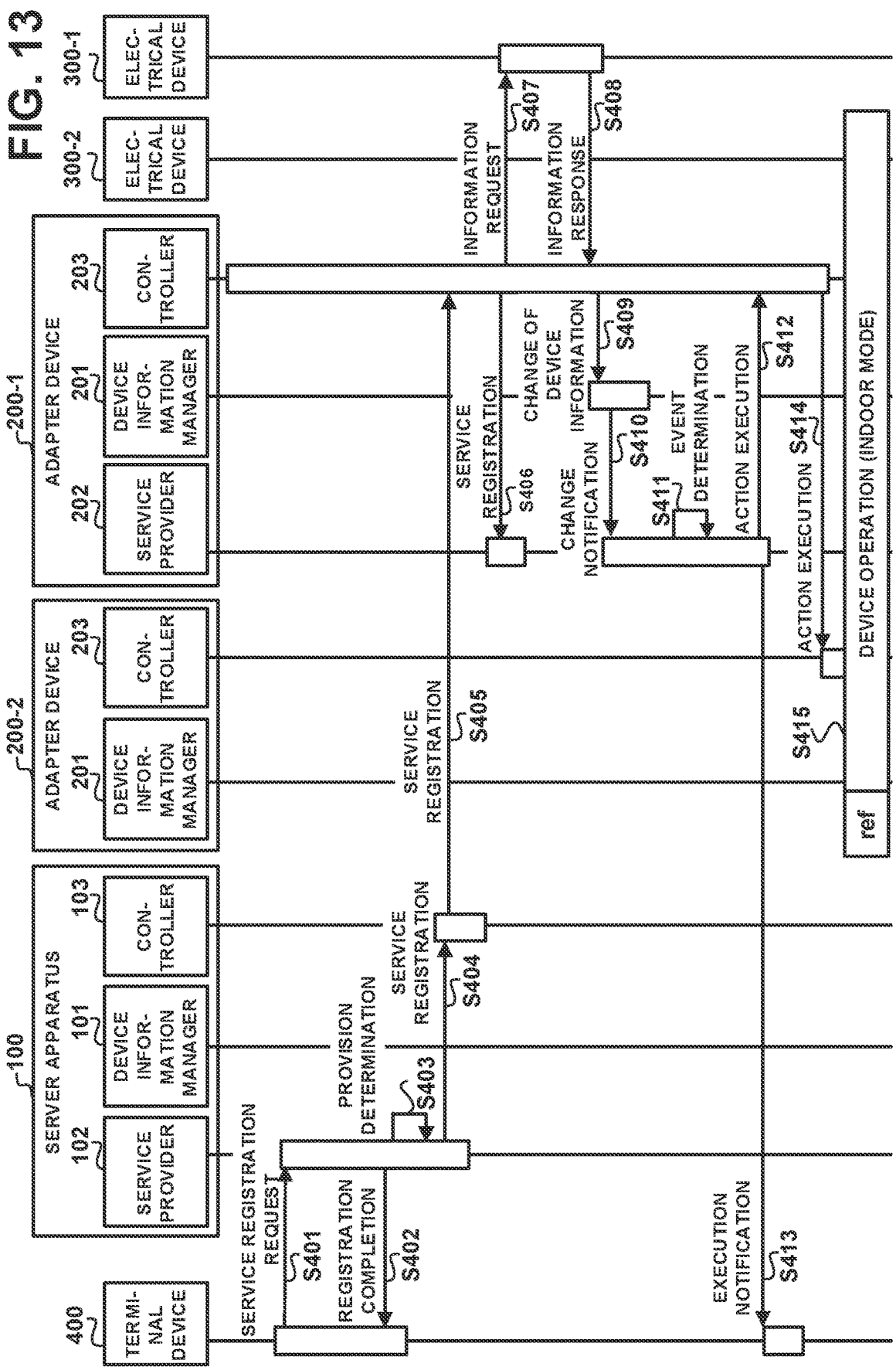
FIG. 13 is a sequence diagram illustrating a process flow of automatic control (edge-device-linking mode) executed between the server apparatus and the adapter device according to Embodiment 1.

FIGS. 10 and 11 are sequence diagrams illustrating flows of processing relating to a service that enables device operation relative to an electrical device 300 by a terminal device 400. FIGS. 12 and 13 are sequence diagrams illustrating flows of processing relating to a service for automatically controlling a plurality of electrical devices 300.

First, FIGS. 10 and 11 are described. The sequence diagram in FIG. 10 illustrates a case where the user is located outside the property and operates the electrical device 300 installed inside the property from outside. The sequence diagram in FIG. 11 illustrates a case where the user is located inside the property and operates the electrical device 300 from inside the property. Here, the property is referred to as a house, and a mode of operation in which the electrical device 300 inside the property is operated from outside is referred to as an "outdoor mode", and a mode of operation in which the electrical device 300 is operated from inside the property is referred to as an "indoor mode". The user of the terminal device 400 sets in advance in which mode, the outdoor mode or the indoor mode, the electrical device 300 is to be operated.

The process flow of device operation in the outdoor mode of FIG. 10 is described.

When a user issues an instruction for the operation of the electrical device 300 using an application of the terminal device 400, the terminal device 400 transmits an operation instruction to the device information manager 101 of the server apparatus 100 (step S101). The operation instruction includes, for example, the electrical device ID and the setting value of the electrical device 300. Upon receiving the operation instruction, the device information manager 101 of the server apparatus 100 sends to the controller 103 a setting request to set the setting value of the electrical device 300 (step S102). The device information manager 101 also transmits to the terminal device 400 information indicating the operation date and time when the operation instruction is received (step S103). The controller 103 sends the setting request to the controller 203 of the adapter device 200 connected to the electrical device 300 relating to the setting request (step S104).

The controller 203 of the adapter device 200 sends an instruction to the device information manager 201 to change the setting value in the device information to the setting value included in the setting request (step S105). The device information manager 201 updates the information of the setting value in the device information and sends a setting request to the controller 203 (step S106). The controller 203 sends the setting request to the electrical device 300 connected to the adapter device 200 (step S107). Upon receiving from the electrical device 300 a setting response indicating that the setting to the setting value relating to the setting request has been completed (step S108), the controller 203 transmits to the electrical device 300 an information request for requesting information with respect to the measurement value measured by the electrical device 300 (step S109). Upon receiving from the electrical device 300 an information response that includes information with respect to the measurement values (step S110), the controller 203 sends to the device information manager 201 an instruction to change the measurement value in the device information to the measurement value included in the information response (step S111), and the device information manager 201 updates the device information. The controller 203 also sends to the controller 103 of the server apparatus 100 a setting response indicating that the setting is completed (step S112). This setting response includes the measurement value received in step S110.

Upon receiving the setting response, the controller 103 of the server apparatus 100 sends to the device information manager 101 an instruction to change the measurement value in the device information to the measurement value included in the setting response (step S113), and the device information manager 101 updates the device information.

The terminal device 400 periodically transmits to the device information manager 101 of the server apparatus 100 an acquisition request to acquire the operation result (step S114), and the device information manager 101 transmits, as a response to the acquisition request, the device information obtained at the time of receiving the acquisition request (step S115). When the terminal device 400 transmits an acquisition request after the device information is updated (step S116), the device information manager 101 transmits the updated device information to the terminal device 400 (step S117). The terminal device 400 notifies the user of the received device information by displaying the device information on the screen.

Next, the process flow of device operation in the indoor mode of FIG. 11 is described.

When the user issues an instruction for the operation of the electrical device 300 using an application of the terminal device 400, the terminal device 400 transmits an operation instruction to the device information manager 201 of the adapter device 200 (step S201). Upon receiving the operation instruction, the device information manager 201 of the adapter device 200 sends to the controller 203 a setting request to set the setting value of the electrical device 300 (step S202). The device information manager 201 of the adapter device 200 transmits to the terminal device 400 information indicating the operation date and time when the operation instruction is received (step S203).

The controller 203 of the adapter device 200 sends to the device information manager 201 an instruction to change the setting value of the device information to the setting value included in the setting request (step S204). The device information manager 201 updates the information on the setting value of the device information and sends a setting request to the controller 203 (step S205). The controller 203 transmits the setting request to the electrical device 300 connected to the adapter device 200 (step S206). Upon receiving from the electrical device 300 a setting response indicating that the setting to the setting value relating to the setting request has been completed (step S207), the controller 203 sends to the electrical device 300 an information request for requesting information with respect to the measurement value measured by the electrical device 300 (step S208). Upon receiving from the electrical device 300 an information response that includes information with respect to the measurement value (step S209), the controller 203 sends to the device information manager 201 an instruction to change the measurement value in the device information to the measurement value included in the information response (step S210), and the device information manager 201 updates the device information.

The terminal device 400 periodically transmits to the device information manager 201 of the adapter device 200 an acquisition request to acquire the operation results (step S211), and the device information manager 201 transmits, as a response to the acquisition request, the device information obtained at the time of receiving the acquisition request (step S212). When the terminal device 400 transmits an acquisition request after the device information is updated (step S213), the device information manager 201 transmits the updated device information to the terminal device 400 (step S214). The terminal device 400 notifies the user of the received device information by displaying the device information on the screen.

The controller 203 of the adapter device 200 transmits to the controller 103 of the server apparatus 100 a setting response indicating that the setting is completed (step S215). This setting response includes the setting value included in the operation instructions in step S201 and the measurement value received in step S209. Upon receiving the setting response, the controller 103 of the server apparatus 100 sends to the device information manager 101 an instruction to change the setting value and the measurement value of the device information to the setting value and measurement value included in the setting response (step S216), and the device information manager 101 updates the device information.

Next, FIGS. 12 and 13 are described. The sequence diagrams of FIGS. 12 and 13 illustrate cases where a user uses a service to automatically control a plurality of electrical devices 300. FIG. 12 illustrates a case where the operation of the electrical devices 300 is controlled via the server apparatus 100 in this automatic control service, and this control mode is hereinafter referred to as "server-device-route mode". The sequence diagram in FIG. 13 illustrates a case where the operation of the electrical devices 300 is controlled by linking of the adapter devices 200 in the above automatic control service, and this control mode is hereinafter referred to as "edge-device-linking mode". The user of the terminal device 400 sets in advance in which mode, the server-device-route mode or the edge-device-linking mode, the service is to be used.

The flow of the automatic control process in the server-device-route mode of FIG. 12 is described.

When a user issues an instruction for the registration of a service using an application of the terminal device 400, the terminal device 400 transmits a request for registration of the service to the service provider 102 of the server apparatus 100 (step S301). The service provider 102 updates the service information based on the content of the service relating to the registration request and transmits notification of completion of the registration to the terminal device 400 (step S302).

On the other hand, the controller 203 of the adapter device 200-1 periodically transmits an information request for requesting information with respect to the measurement value measured by the electrical device 300-1 (step S303) and receives an information response including information with respect to the measurement value from the electrical device 300-1 (step S304). The periodic transmission of information request and reception of information responses are also performed between the adapter device 200-2 and the electrical device 300-2, but these processes are omitted in FIG. 12. The controller 203 of the adapter device 200-1 sends to the device information manager 201 an instruction to change the measurement value in the device information to the measurement value included in the information response (step S305), and the device information manager 201 updates the device information and notifies the controller 203 of the updated device information (step S306). The controller 203 transmits to the controller 103 of the server apparatus 100 the updated device information to notify the controller 103 of the updated device information (step S307).

The controller 103 of the server apparatus 100 sends to the device information manager 101 an instruction for updating to the received device information (step S308), and the device information manager 101 updates the device information. The device information manager 101 then sends to the service provider 102 a change notification indicating that the device information is changed (step S309). Upon receiving the notification of the change in the device information, the service provider 102 determines, with reference to the event information included in the service information, whether or not the state of the electrical device 300-1 satisfies the condition indicated by the event information (step S310). This determination is hereinafter referred to as "event determination". Upon determining that the state of the electrical device 300-1 satisfies the condition indicated by the event information, the service provider 102 sends to the controller 103 an action execution instruction to cause the electrical device 300 indicated by the action information to perform the operation indicated by the action information (step S311).

Here, the electrical device 300 indicated by the action information is assumed to be the electrical device 300-2. When the controller 103 receives the action execution instruction, the process from step S104 to step S117 of the device operation in the outdoor mode illustrated in FIG. 10 is performed among the server apparatus 100, the adapter device 200-2, the electrical device 300-2, and the terminal device 400 (step S312). Specifically, the controller 103 transmits a setting request to the adapter device 200-2 connected to the electrical device 300-2 (step S104), and the processing of step S105 and the subsequent steps is performed.

When the service provider 102 sends the action execution instruction to the controller 103, the service provider 102 transmits to the terminal device 400 an execution notification that the action indicated in the action information has been executed (step S313).

For example, in an example case of a process to perform a service that is to "link between water heater and bathroom dehumidifier" indicated by the service ID "1-1" of the service information in FIG. 6", the electrical device 300-1 is considered to be a water heater and the electrical device 300-2 is considered to be a bathroom dehumidifier in the sequence diagram of FIG. 12. In step S304, when a response indicating start of water heating is transmitted from the water heater, processing of steps S305 and S306 is performed in the adapter device of the water heater, and the adapter device transmits to the server apparatus 100 a notification indicating start of the water supply (step S307). After the server apparatus 100 performs the processing of steps S308 and S309, the service provider 102 makes an event determination (step S310) and sends to the controller 103 an action execution instruction to cause the bathroom dehumidifier to perform heating operation at the set temperature of 20° C. The controller 103 transmits a setting request to the adapter device of the bathroom dehumidifier, and the process of device operation in the outdoor mode is started (step S312).

Next, the process flow of automatic control in the edge-device-linking mode of FIG. 13 is described. In FIG. 13, the adapter device 200-1 is an example of a first edge device, the adapter device 200-2 is an example of a second edge device, the electrical device 300-1 is an example of a first electrical device, and the electrical device 300-2 is an example of a second electrical device.

The processing of steps S401 and S402 in FIG. 13 is the same as the processing of steps S301 and S302 in FIG. 12. The service provider 102 determines whether or not the adapter device 200 can provide a registered service (step S403). For example, the content of the service is assumed to be the link between the electrical devices 300-1 and 300-2, and that the service provider 102 is assumed to determine that the adapter device 200-1 of electrical device 300-1 can provide the service. In this case, the service provider 102 sends to the controller 103 a registration instruction to instruct the adapter device 200-1 to register the service (step S404), and the controller 103 transmits the registration instruction of the service to the controller 203 of the adapter device 200-1 (step S405). The registration instruction includes information with respect to the items indicated in the service information in FIG. 6.

The controller 203 of the adapter device 200-1 sends the service registration instruction to the service provider 202 (step S406), and the service provider 202 registers the service in the service information managed by the adapter device 200-1 based on the information included in the registration instruction.

On the other hand, the controller 203 of the adapter device 200-1 periodically transmits an information request for requesting information with respect to the measurement value measured by the electrical device 300-1 (step S407) and receives an information response including information with respect to the measurement value from the electrical device 300-1 (step S408). The periodic transmission of information requests and reception of information responses are also performed between the adapter device 200-2 and the electrical device 300-2, but these processes are omitted in FIG. 13. The controller 203 of the adapter device 200-1 sends to the device information manager 201 an instruction to change the measurement value in the device information to the measurement value included in the information response (step S409), and the device information manager 201 updates the device information and sends to the service provider 202 a change notification indicating that the device information is changed (step S410).

Upon receiving the notification of the change in the device information, the service provider 202 performs, with reference to the event information included in the service information, an event determination for the state of the electrical device 300-1 (step S411). Upon determining that the state of the electrical device 300-1 satisfies the condition indicated in the event information, the service provider 202 sends to the controller 203 an action execution instruction to cause the electrical device 300-2 to perform the operation indicated in the action information (step S412). The service provider 202 transmits to the terminal device 400 an execution notification that the action indicated in the action information is executed (step S413).

Upon receiving the action execution instruction, the controller 203 of the adapter device 200-1 sends the action execution instruction to the controller 203 of the adapter device 200-2 to which the electrical device 300-2 is connected (step S414), and the processing of steps S204 to S216 of the device operation in the indoor mode illustrated in FIG. 11 is performed among the server apparatus 100, adapter device 200-2, electrical device 300-2, and terminal device 400 (step S415).

For example, in an example case of a process to perform a service that is to "link between air conditioner and IH cooker" indicated by the service ID "1-2" of the service information in FIG. 6, the electrical device 300-1 is considered to be an air conditioner and the electrical device 300-2 is considered to be an IH cooking device in the sequence diagram of FIG. 13. In step S408, when a response indicating detection of user's sleep onset is transmitted from the air conditioner, processing of steps S409 to S413 is performed in the adapter device of the air conditioner. Then, the controller 203 of the adapter device of the air conditioner transmits, to the controller 203 of the adapter device of the IH cooker, an action execution instruction to turn off the power of the IH cooker (step S414), and the process of the device operation in the indoor mode to turn off the power is started (step S415).

Use of services provided by the IoT platform with respect to electrical devices heretofore requires communication with a server apparatus. However, the device operation in the indoor mode and the automatic control in the edge-device-linking mode of the present embodiment enables control of the electrical devices without the intervention of the server apparatus. This enables control of the electrical devices even when communication with the server apparatus is interrupted due to a network failure. Also, increasing the amount of processing that can be performed by the edge device can reduce the amount of communication with the server apparatus.

Also, having the edge device have a service providing function of the server apparatus of the present embodiment can achieve such autonomous linking processing by the edge device as the automatic control in the edge-device-linking mode.

Also, having the edge device have a device information management function and a service providing function of the server device in the present embodiment can achieve control of the electrical devices without intervention via the server apparatus, and thus processing that requires high real-time performance can be performed. For example, for electrical devices such as the IH cooker, the bathroom dehumidifier, and the bathroom air conditioner, which might pose a danger to the user if the electrical devices are not controlled immediately, danger can be avoided by controlling the electrical devices in the indoor mode and the edge-device-linking mode.

Also, since the edge device and server apparatus of the present embodiment use a common API, the burden of development can be reduced.

Embodiment 2

The edge device linking system 1 according to Embodiment 2 is a system in which a gateway device is added to the edge device linking system 1 according to embodiment 1.

Figure 14:
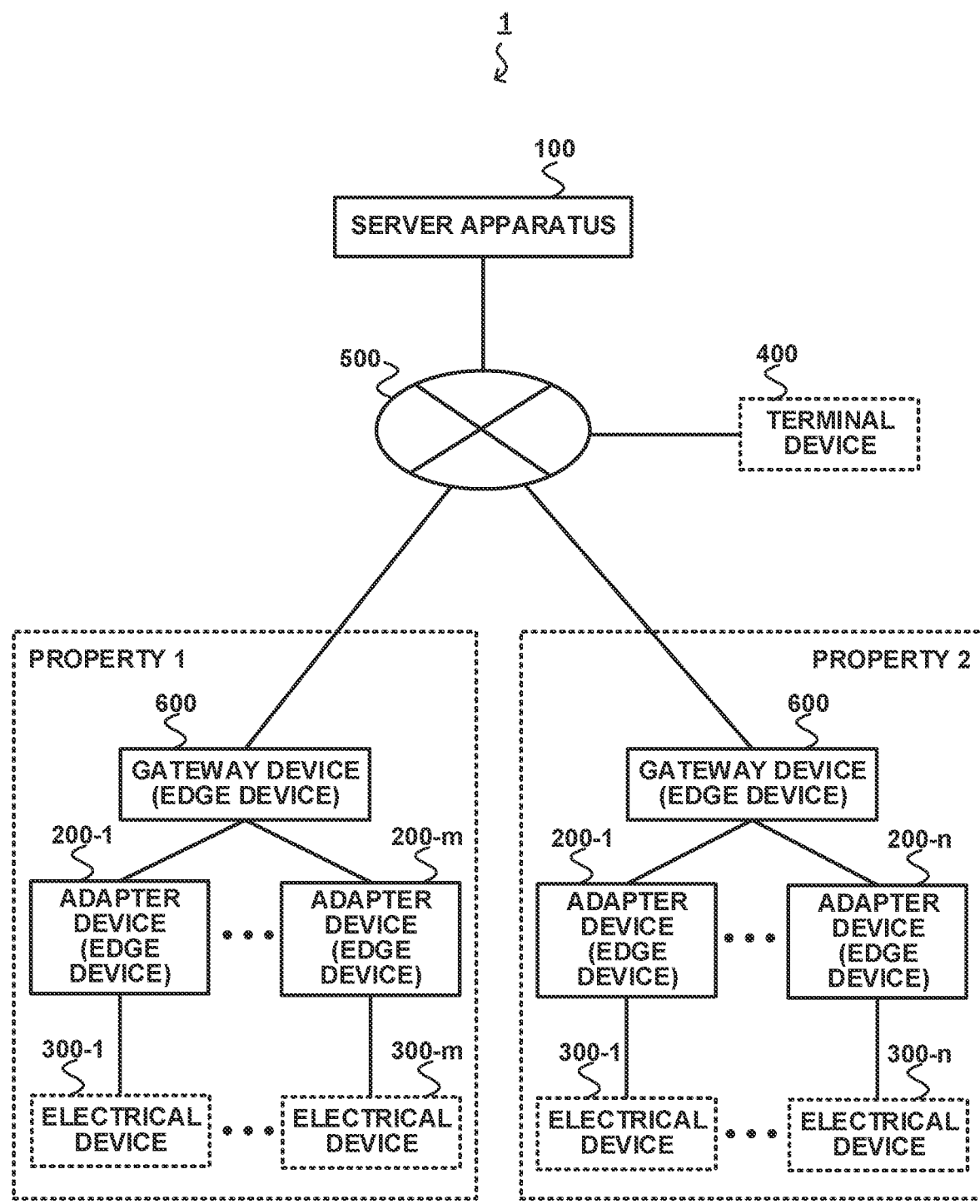
FIG. 14 is a block diagram illustrating an overall configuration of an edge device linking system according to Embodiment 2.

As illustrated in FIG. 14, the edge device linking system 1 includes a server apparatus 100 that provides a service, an adapter device 200 that is connected to an electrical device 300 installed in a property, and a gateway device 600 installed in each property. The gateway device connects to the adapter device 200 in the same property where the gateway device is installed. In the present embodiment, the edge device includes the gateway device 600 that relays the communication between the server apparatus 100 and the adapter device 200.

Functions of the server apparatus 100 and the adapter device 200 are similar to those of Embodiment 1.

Functions of the gateway device 600 are described with reference to FIG. 15. The gateway device 600 includes some of functions of the server apparatus 100. Specifically, the gateway device 600 includes a device information manager 601 that manages device information relating to the electrical device 300, a service provider 602 that manages service information, a controller 603 that controls the electrical device 300 via the adapter device 200, a user information manager 604 that manages user information relating to the user, and a property information manager 605 that manages property information about the property where the electrical device 300 is installed.

The device information manager 601 manages the device information of the electrical device 300 connected to the adapter device 200 to which the gateway device 600 is connected. Specifically, the device information manager 601 receives from the terminal device 400 an instruction for operation of the electrical device 300, sends the received instruction to the controller 603, and registers the device information based on the information received from the controller 603. The device information manager 601 is achieved by cooperation of the processor 21, the main storage 22, the auxiliary storage 23, and the wide-area communicator 24. The device information manager 601 is an example of device information management means.

The device information managed by the device information manager 601 has the same items as the items included in the table in FIG. 5, but only includes information with respect to the electrical device 300 connected to the gateway device 600 via the adapter device 200. Here, the connected electrical device includes both a physically connected electrical device and a logically connected electrical device. For example, in the case of the gateway device 600 installed in the property 1, the device information managed by the device information manager 601 includes only the device information associated with the property ID "1" in the table in FIG. 5.

Figure 15:
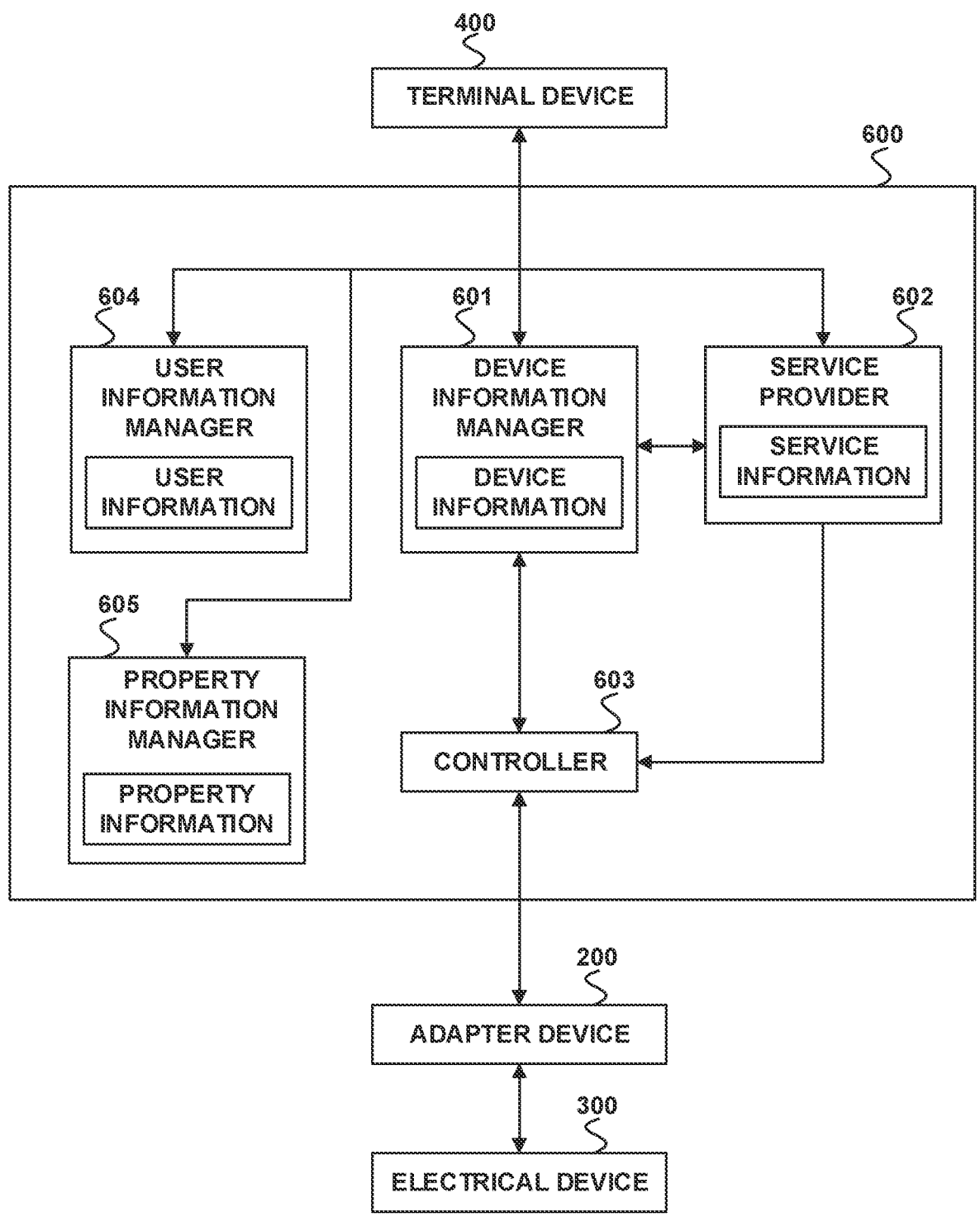
FIG. 15 is a block diagram illustrating a functional configuration of a gateway device according to Embodiment 2.

The service provider 602 of FIG. 15 manages execution of services. Specifically, the service provider 602 receives from the server apparatus 100 an instruction to register a service and registers the contents of the service as service information. The service provider 602 determines, based on the service information, whether or not to operate the electrical device 300. The service provider 602 is achieved by cooperation of the processor 21, the main storage 22, the auxiliary storage 23, and the wide-area communicator 24. The service provider 602 is an example of the first service provision means and the service provision means.

The service information managed by the service provider 602 has the same items as the items included in the table in FIG. 6, but only includes information relating to the service directed to the electrical device 300 connected to the gateway device 600 via the adapter device 200. For example, in the case of the gateway device 600 installed in property 1, the service information managed by the service provider 602 only includes the service information associated with property ID "1" in the table in FIG. 6.

The controller 603 of FIG. 15 controls operation of the electrical device 300 connected to the gateway device 600 via the adapter device 200. Specifically, the controller 603 receives an instruction for operation of the electrical device 300 from the device information manager 601 and the service provider 602, and transmits the instruction to the electrical device 300 via the controller 203 of the adapter device 200. The controller 603 also receives an instruction for operation of the electrical device 300 from the controller 103 of the server apparatus 100 and transmits the instruction to the electrical device 300 via the controller 203 of the adapter device 200. The controller 603 periodically collects data, such as measurement values and setting values, from the electrical device 300 via the controller 203 of the adapter device 200. The controller 603 is achieved by cooperation of the processor 21, the wide-area communicator 24, and the local communicator 25.

The user information manager 604 of FIG. 15 manages user information about a user who uses the electrical device 300. Specifically, the user information manager 604 receives registration of user information from the terminal device 400 and registers the received information. The user information manager 604 is achieved by cooperation of the processor 21, the main storage 22, the auxiliary storage 23, and the wide-area communicator 24.

The user information managed by the user information manager 604 is the same as the items included in the table in FIG. 7, but only includes information relating to the user who is the user of the electrical device 300 connected to the gateway device 600 via the adapter device 200. For example, in the case of the gateway device 600 installed in property 1, the user information managed by the user information manager 604 only includes the information of the user of the electrical device 300 included in property 1. Assuming that the user of the electrical device 300 included in property 1 is the user with user ID "1," the user information managed by the user information manager 604 only includes the information of the user associated with the user ID "1" in the table in FIG. 7.

The property information manager 605 of FIG. 15 manages the property information with respect to the property where the gateway device 600 is installed. Specifically, the property information manager 605 receives the registration of property information from the terminal device 400 and registers the received information. The property information manager 605 is achieved by cooperation of the processor 21, the main storage 22, the auxiliary storage 23, and the wide-area communicator 24.

The property information managed by the property information manager 605 is the same as the items included in the table in FIG. 8, but only includes information about the property where the gateway device 600 is installed. For example, in the case of the gateway device 600 installed in the property 1, the property information managed by the property information manager 605 only includes the property information associated with the property ID "1" in the table in FIG. 8.

For example, upon a user instructing the gateway device 600 installed in the property with the property ID "1" to register the property information by specifying the property name using the application of the terminal device 400, the terminal device 400 transmits a registration request to the gateway device 600, and the property information manager 605 of the gateway device 600 updates the property information based on the contents of the registration request. The property information manager 605 then notifies the terminal device 400 of completion of the registration. The property information manager 605 transmits the registered property information to the controller 103 of the server apparatus 100, and the property information manager 105 of the server apparatus 100 updates the property information with the content of the transmitted property information.

The API for transmitting and receiving information between the gateway device 600 and the external device in FIG. 15 is the same as the APIs used in the server apparatus 100 and the adapter device 200.

Next, operation of the edge device linking system 1 of the present embodiment is described. The following describes parts different from the process flow of the operation of the edge device linking system 1 of Embodiment 1.

In the process of the device operation in the outdoor mode in the edge device linking system 1 of Embodiment 2, the gateway device 600 relays the transmission and reception of information between the server apparatus 100 and the adapter device 200 in the sequence diagram of FIG. 10. Furthermore, the device information is also updated in the device information manager 601 of the gateway device 600.

In the process of device operation in the indoor mode in the edge device linking system 1 of Embodiment 2, the gateway device 600 relays the transmission and reception of information between the terminal device 400 and the adapter device 200 in the sequence diagram of FIG. 11 and between the server apparatus 100 and the adapter device 200 in the sequence diagram of FIG. 11. In addition, the device information is updated also in the device information manager 601 of the gateway device 600.

In the process of automatic control in the server-device-route mode in the edge device linking system 1 of Embodiment 2, the gateway device 600 relays the transmission and reception of information between the server apparatus 100 and the adapter devices 200-1, 200-2 in the sequence diagram of FIG. 12. Furthermore, the device information is updated also in the device information manager 601 of the gateway device 600.

In the process of automatic control in the edge-device-linking mode in the edge device linking system 1 of Embodiment 2, the gateway device 600 relays the transmission and reception of information between the server apparatus 100 and the adapter devices 200-1, 200-2 in the sequence diagram of FIG. 13. The device information is updated in the device information manager 601 of the gateway device 600. The service provider 602 of the gateway device 600 performs service registration, event determination, action execution instruction, and action execution notification; and the adapter device 200-1 does not perform these processes. The gateway device 600 is an example of the first edge device.

According to the present embodiment, effects similar to those produced by the edge device linking system 1 of embodiment 1 can be achieved.

Since the server apparatus where the IoT platform is built manages information with respect to a large number of users and properties, processing such as registration, modification, and the like may be requested at the same time. In such cases, processing of the request would take much time and the amount of data communication would be high. However, according to the present embodiment, since the gateway device has a user management function and a property management function, a user can perform processing such as registration, modification, and the like in the gateway device with no need to access the server apparatus every time the processing is performed. Then, the gateway device transmits, to the server apparatus, information relating to the registration and the modification at a freely selected timing, thereby achieving reduction of the amount of data communication.

Modified Examples

Although some embodiments of the present disclosure are described above, various modifications and applications are possible in implementing the present disclosure.

In Embodiment 1 and Embodiment 2, each adapter device 200 includes the device information manager 201 and the service provider 202, but configuration of the present disclosure is not limited thereto. The device information manager 201 and the service provider 202 may optionally be included only in a specific adapter device 200, and the other adapter devices 200 may optionally include only the controller 203.

Also, in Embodiment 2, the device information manager 601 and the service provider 602 may optionally be included only in the gateway device 600, and the adapter device 200 connected to the gateway device 600 may optionally include only the controller 203.

In Embodiment 2, one gateway device 600 is installed for one property, but one gateway device 600 may be installed for multiple properties. In this case, the user information manager 604 of the gateway device 600 manages the plurality of user information for using the electrical device 300 of each property, and the property information manager 605 manages the property information of the plurality of properties.

In Embodiment 1 and Embodiment 2, the adapter device 200 and the gateway device 600, which are the edge devices, have some functions of the server apparatus 100, but the functions provided by the edge devices are not limited to the functions shown in Embodiment 1 and Embodiment 2. For example, the functions provided by the edge devices may be determined based on memory capacities available in the edge devices. Alternatively, the edge device may be determined to have the functions of collecting and updating information offline.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can provide an edge device linking system, a method for coordinating edge devices, and a program that can provide a service relating to electrical devices by linking between edge devices without performing communication with a server apparatus.

The invention claimed is:

1. An edge device linking system, comprising:
a first edge device to be connected to a first electrical device;
a second edge device to be connected to a second electrical device; and
a server apparatus to provide a service relating to the first electrical device and the second electrical device, wherein
the first edge device, the second edge device, and the server apparatus are communicatively connected to one another,
the first edge device includes
a device information manager to manage device information with respect to the first electrical device, and
a first service provider to manage service information and provide the service based on the service information, the service information indicating content of the service and including action information indicating an operation of the second electrical device and event information indicating a condition for executing the operation indicated by the action information,
the second edge device includes a controller to control the operation of the second electrical device,
when the first service provider of the first edge device determines that the device information with respect to the first electrical device satisfies the condition indicated by the event information, the first service provider of the first edge device causes the controller of the second edge device to control the second electrical device to perform the operation indicated by the action information,
the server apparatus comprises a second service provider to receive a registration request of the service information, and
the second service provider determines, based on a relationship between the first edge device and the second edge device, whether provision of the service indicated by the service information relating to the registration request is achievable by the first edge device, and when determination is made that the provision is achievable, the second service provider causes the first service provider of the first edge device to manage the received service information.

2. The edge device linking system according to claim 1, wherein application programming interfaces (APIs) for performing transmission and reception of information between the first edge device and an external device and between the second edge device and the external device are a same as an API for performing transmission and reception of information between the server apparatus and the external device.

3. The edge device linking system according to claim 1, wherein the first edge device is an adapter device that enables communication of the first electrical device with the server apparatus, and
the second edge device is an adapter device that enables communication of the second electrical device with the server apparatus.

4. The edge device linking system according to claim 1, wherein
the first edge device is a gateway device that relays communication of the server apparatus with an adapter device connected to the first electrical device and with an adapter device connected to the second electrical device,
the gateway device communicates with the first electrical device via the adapter device connected to the first electrical device, and
the second edge device is an adapter device connected to the second electrical device and communicates with the server apparatus via the gateway device.

5. An edge device linking method executable in an edge device linking system in which a first edge device connected to a first electrical device, a second edge device connected to a second electrical device, and a server apparatus to provide a service relating to the first electrical device and the second electrical device are communicatively connected to one another, the method comprising:
managing, by a device information manager of the first edge device, device information with respect to the first electrical device,
causing, by a first service provider of the first edge device, a controller of the second edge device to control the second electrical device to perform an operation indicated by action information indicating the operation of the second electrical device, when the first service provider of the first edge device determines, with reference to service information indicating content of the service and including the action information and event information indicating a condition for executing the operation indicated by the action information, that the device information with respect to the first electrical device satisfies the condition indicated by the event information, and
by a second service provider of the server apparatus, upon receiving a registration request of the service information, determining, based on a relationship between the first edge device and the second edge device, whether provision of the service indicated by the service information relating to the registration request is achievable by the first edge device, and when determination is made that the provision is achievable, causing the first service provider of the first edge device to manage the received service information.

6. A non-transitory computer-readable recording medium storing a program, the program causing a computer connected to a first electrical device to function as:
a device information manager to manage device information with respect to the first electrical device, and
a service provider to cause a computer connected to a second electrical device to control the second electrical device to perform an operation indicated by action information indicating the operation of the second electrical device, when the service provider determines, with reference to service information indicating content of a service relating to the first electrical device and the second electrical device and including the action information and event information indicating a condition for executing operation indicated by the action information, that device information with respect to the first electrical device satisfies the condition indicated by the event information, wherein the service provider manages service information relating to a registration request received by another computer that is communicatively connected to the computer connected to the first electrical device and the computer connected to the second electrical device, the service information being information for which determination is made, based on a relationship between the computer connected to the first electrical device and the computer connected to the second electrical device, by the another computer that provision of the service by the computer connected to the first electrical device is achievable.

* * * * *